United States Patent
Steinman (10) Patent No.: US 9,821,261 B2
(45) Date of Patent: Nov. 21, 2017

(54) INLINE DUMP-ABLE FUEL SYSTEM DUST FILTER WITH PRESSURE RELIEF VALVE

(71) Applicant: Stoneridge, Inc., Warren, OH (US)

(72) Inventor: Robert J. Steinman, Lexington, OH (US)

(73) Assignee: Stoneridge, Inc., Warren, OH (US)

( * ) Notice: Subject to any disclaimer, the term of this patent is extended or adjusted under 35 U.S.C. 154(b) by 208 days.

(21) Appl. No.: 14/743,410

(22) Filed: Jun. 18, 2015

(65) Prior Publication Data
US 2015/0369182 A1     Dec. 24, 2015

Related U.S. Application Data

(60) Provisional application No. 62/013,821, filed on Jun. 18, 2014.

(51) Int. Cl.
| | |
|---|---|
| *B01D 46/42* | (2006.01) |
| *B01D 46/00* | (2006.01) |
| *B01D 46/24* | (2006.01) |
| *F02M 37/22* | (2006.01) |

(52) U.S. Cl.
CPC ..... *B01D 46/4272* (2013.01); *B01D 46/0005* (2013.01); *B01D 46/0087* (2013.01); *B01D 46/2403* (2013.01); *F02M 37/22* (2013.01)

(58) Field of Classification Search
CPC ............ B01D 46/0005; B01D 46/0087; B01D 46/2403; B01D 46/2414; B01D 46/4272; B01D 2265/06; F02M 37/22
See application file for complete search history.

(56) References Cited

U.S. PATENT DOCUMENTS

| | | | |
|---|---|---|---|
| 3,738,089 A * | 6/1973 | Brill ................. | B01D 46/0087 181/231 |
| 4,017,397 A | 4/1977 | Copeland | |
| 5,855,783 A * | 1/1999 | Shucosky ............ | B01D 29/111 210/493.1 |
| 6,183,526 B1 * | 2/2001 | Suzuki ............... | B01D 53/0415 55/311 |
| 7,017,563 B2 * | 3/2006 | Dworatzek ........... | B01D 29/23 123/574 |
| 2003/0140970 A1 | 7/2003 | Benjey | |
| 2006/0006124 A1 * | 1/2006 | Yates .................... | B01D 29/21 210/791 |
| 2006/0191578 A1 | 8/2006 | Treudt et al. | |

(Continued)

FOREIGN PATENT DOCUMENTS

| | | |
|---|---|---|
| CN | 102853125 | 1/2013 |
| KR | 10-1098380 | 12/2011 |

OTHER PUBLICATIONS

International Search Report and Written Opinion dated Sep. 21, 2015 in corresponding PCT Patent Application No. PCT/US15/36449.

*Primary Examiner* — Robert Clemente
(74) *Attorney, Agent, or Firm* — Grossman, Tucker, Perreault & Pfleger, PLLC (57) ABSTRACT

A number of variations may include a product comprising a dump-able filter comprising: a filter body; a filter assembly, wherein the filter assembly is seated in the filter body; and a filter cap, wherein the filter cap attaches to the filter body and encloses at least a portion of the filter assembly. In some embodiments the filter assembly may include a filter carrier that includes a pressure relief valve.

16 Claims, 9 Drawing Sheets

(56) References Cited

U.S. PATENT DOCUMENTS

| | | | | |
|---|---|---|---|---|
| 2009/0050121 A1* | 2/2009 | Holzmann | ............ | B01D 45/04 |
| | | | | 123/573 |
| 2011/0017155 A1* | 1/2011 | Jacob | ................ | B01D 46/0031 |
| | | | | 123/41.86 |
| 2012/0193275 A1* | 8/2012 | Kim | ...................... | B01D 27/08 |
| | | | | 210/130 |

\* cited by examiner

INLINE DUMP-ABLE FUEL SYSTEM DUST FILTER WITH PRESSURE RELIEF VALVE

CROSS-REFERENCE TO RELATED APPLICATIONS

This application claims the benefit of priority to U.S. provisional Application No. 62/013,821, filed Jun. 18, 2014, the entire content of which is incorporated herein by reference.

TECHNICAL FIELD

The field to which the disclosure generally relates to includes filters.

BACKGROUND

A fuel system may include a filter.

SUMMARY OF ILLUSTRATIVE VARIATIONS

One variation may include a product comprising a dump-able filter comprising: a filter body; a filter assembly, wherein the filter assembly is seated in the filter body; and a filter cap, wherein the filter cap attaches to the filter body and encloses at least a portion of the filter assembly.

Another variation may include a method comprising providing a dump-able dust filter for a fuel system comprising: providing a filter assembly inside of a filter body and a filter cap; rotating the filter cap in a first direction to lock the filter cap onto the filter body; rotating the filter cap in a second direction to unlock the filter cap from the filter body; removing contaminants from the dump-able dust filter; and replacing the filter cap back onto the filter body and rotating the filter cap in a first direction to lock the filter cap onto the filter body.

Another variation may include a method comprising providing a dump-able dust filter for a fuel system comprising: providing a first filter assembly inside of a filter body and a filter cap; rotating the filter cap in a first direction to lock the filter cap onto the filter body; rotating the filter cap in a second direction to unlock the filter cap from the filter body; removing the first filter assembly from the filter body; providing a second filter assembly inside of the filter body; and replacing the filter cap back onto the filter body and rotating the filter cap in a first direction to lock the filter cap onto the filter body.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
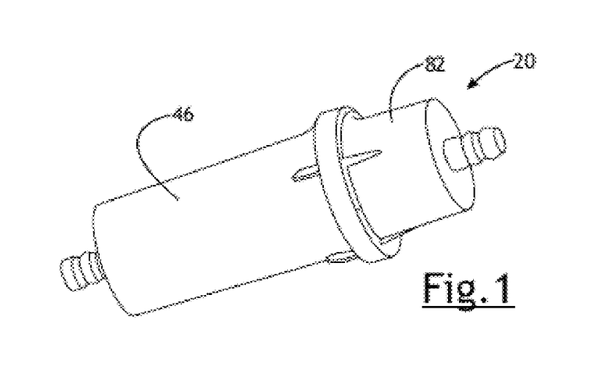
FIG. 1 illustrates a perspective view of a dump-able dust filter according to a number of variations.
Figure 2:
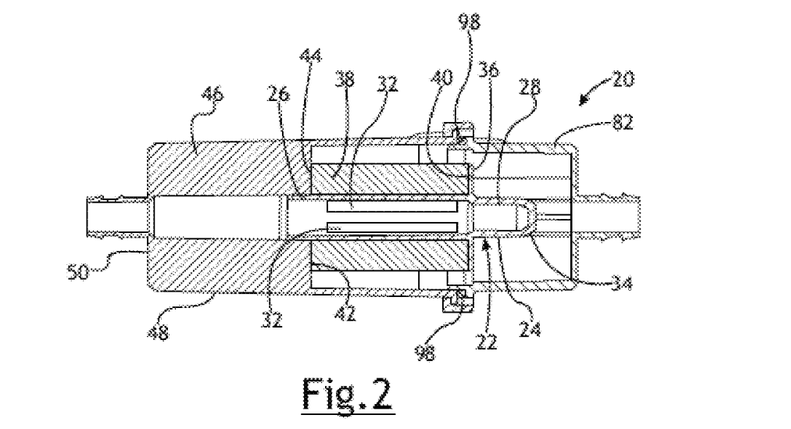
FIG. 2 illustrates a sectional view of a dump-able dust filter according to a number of variations.

Referring to FIGS. 1 and 2, in a number of variations a product may comprise a dump-able dust filter 20. A dump-able dust filter 20 may comprise a filter assembly 22, a filter body 46, an O-ring 98, and a filter cap 82. The dump-able dust filter 20 may allow dust and/or other contaminants to be dumped out of the dump-able dust filter 20 periodically so that the dump-able dust filter 20 may be reused numerous times which may increase the life of the dump-able filter 20 and/or the fuel system canister 112, as will be discussed below. While an automotive vehicle fuel system 108 is illustrated below for exemplary purposes, it should be recognized that the dump-able dust filter 20 may be used to protect any number of fuel systems including, but not limited to, tractors, dirt bike, lawn mower and/or general lawn equipment, four-wheelers, and/or recreational vehicle systems. The dump-able dust-filter 20 may also be used for in an engine air intake system and/or in a cooling air system for any number of electric motors. The dump-able dust filter 20 may also be implemented into a pond filter.

Figure 3:
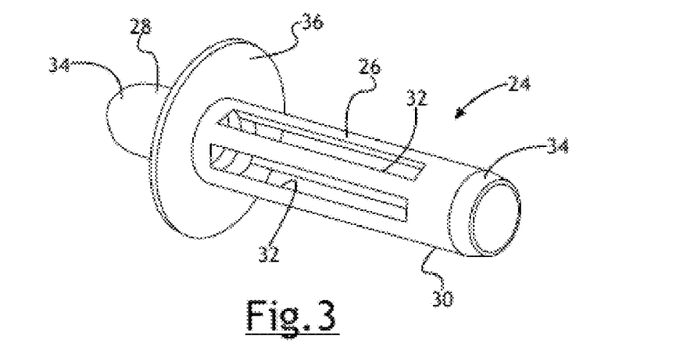
FIG. 3 illustrates a perspective view of a filter carrier according to a number of variations.

Referring to FIGS. 2-5, in a number of variations, a filter assembly 22 may include a filter carrier 24 and a filter element 38. In a number of variations, a filter carrier 24 may comprise a body 26, a first end 28, and a second end 30 and may be any number of shapes including, but not limited to cylindrical. The filter carrier 24 may be hollow and may act as a flow passage for air that may travel there through. The filter carrier body 26 may include one or more slots 32 which may be constructed and arranged to allow an air flow to travel through a filter element 38 and into a filter body center tunnel 64 as will be discussed hereafter. The first end 28 may be constructed and arranged to mate with a filter cap 82 as will be discussed hereafter. The first end 28 may include a taper 34 inward which may assist in assembly of the filter cap 82 onto the filter carrier 24 as will be discussed hereafter. The second end 30 may also include a taper 34 inward, for example as illustrated in FIG. 3, which may assist in assembly of the filter carrier 24 into a filter body center tunnel 64 as will be discussed hereafter. A lip 36 may extend radially from the filter carrier body 26 adjacent the first end 28. The filter carrier 24 may be any of a number of materials including, but not limited to one or more polymeric materials.

Figure 5:
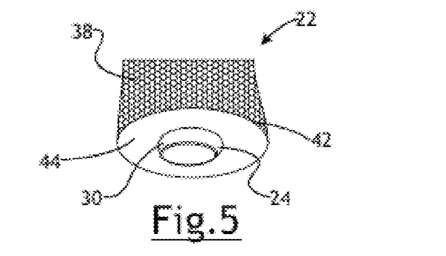
FIG. 5 illustrates a bottom perspective view of a filter element according to a number of variations.
Figure 6:
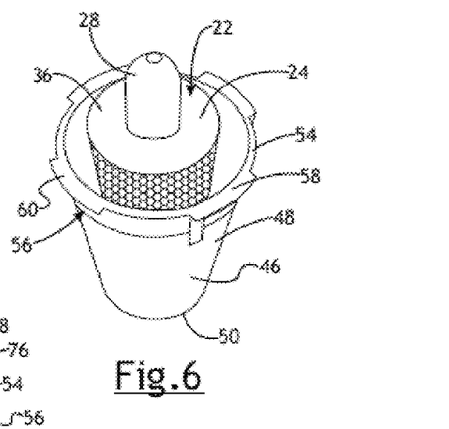
FIG. 6 illustrates a perspective view of a filter body and a filter assembly according to a number of variations.

In any number of variations, a filter element 38 may be assembled onto the filter carrier body 26. The filter element 38 may comprise a first end 40 and a second end 42. The first end 42 of the filter element 38 may seat against the lip 36 of the filter carrier 24 and the second end 42 of the filter element 38 may extend a distance along the filter carrier body 26 so that a portion of the second end 30 of the filter carrier 24 may be exposed, for example as illustrated in FIG. 5. The filter element 38 may comprise any number of materials including, but not limited to, any number of foams, pleated woven plastic, woven fibers, non-woven fibers, screens, and/or pleated paper. In a number of variations, the second end 42 of the filter element 40 may include a barrier element 44, for example as illustrated in FIG. 5, which may assist in containing dust/contaminants that may collect in the dust/contamination collection chamber 76 located in the filter body 46 from entering back into the air flow path and into the filter element 38. The first end 40 may also include a barrier element 44 which may element the need for a particular orientation of the filter element 38 during assembly. The barrier element 44 may comprise any number of materials including, but not limited to, a foil.

Figure 4:
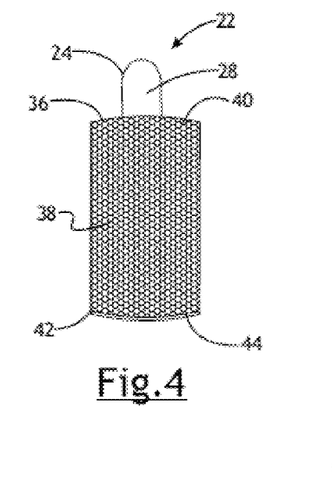
FIG. 4 illustrates a perspective view of a filter element according to a number of variations.
Figure 7:
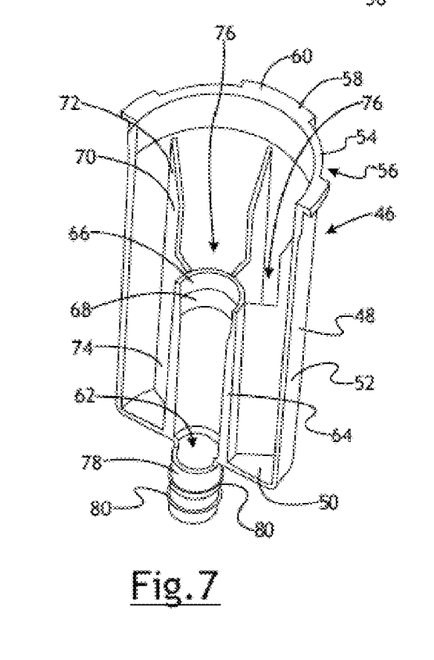
FIG. 7 illustrates a section view of a filter body according to a number of variations.
Figure 8:
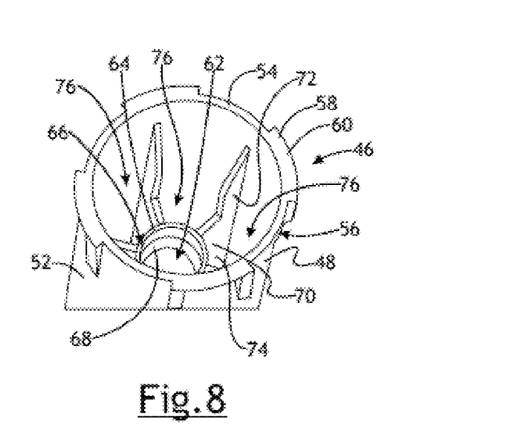
FIG. 8 illustrates a top perspective view of a filter body according to a number of variations.

Referring to FIGS. 1-2 and 6-8, in a number of variations, the filter assembly 22 may be placed inside of a filter body 46. In a number of variations, a filter body 46 may comprise a cup component 48, a center tunnel 64, one or more collection chambers 76, and an outlet port 78, best illustrated in FIG. 7. The cup component 48 may comprise a base 50 and a body structure 52. The cup component 48 may be any number of shapes including, but not limited to, cylindrical. A lip 54 may extend radially outward from the perimeter of a first end 56 of the body structure 52. The lip 54 may also include one or more locking features 58 including, but not limited to twist lock tabs 60 which may be constructed and arranged to mate and lock with a filter cap 82 locking feature 96 as will be discussed hereafter. A through-hole 62 may extend through the base 50 of the cup component 48 so that air may exit the filter body 46 through the outlet port 78. The center tunnel 64 may extend a distance upward from the perimeter of the through-hole 62 in the base 50 of the cup component 48 and may act as a flow passage for air which may be traveling through the dump-able filter 20 as will be discussed hereafter. A first end 66 of the center tunnel 64 may be constructed and arranged to mate with a second end 30 of the filter carrier 24. The first end 66 of the center tunnel 64 may also include a chamfer 68 which may assist in the assembly of the filter carrier 24 into the filter body 46, best illustrated in FIGS. 7 and 8. A plurality of chamber walls 70 may extend from the center tunnel 64 to the body structure 52. The chamber walls 70 may each include an upper portion 72 and a lower portion 74. The lower portion 74 of the chamber walls 70 may be constructed and arranged to form one or more dust/contaminant collection chambers 76, for example as illustrated in FIG. 7. The upper portion 72 may be constructed and arranged to provide a lead-in angle for installation of the filter assembly 22. The upper portion 72 may also be constructed and arranged to assist in centering the filter assembly 22 in the filter body 46. In one variation, the lower portion 74 may extend horizontally from the center tunnel 64 to the body structure 52 and may form an approximate 90 degree angle with the upper portion 72. The upper portion 72 may extend upward and may gradually taper inward as it extends upward toward the first end 56 of the body structure 52, for example as illustrated in FIGS. 7 and 8. The outlet port 78 may extend downward from the perimeter of the through-hole 62 on the base 50 of the cup component 48. The outlet port 78 may be any number of shapes including, but not limited to, cylindrical and may include one or more locking features 80 which may include, but are not limited to, one or more locking tabs, for example as illustrated in FIG. 4. The outlet port 78 may be constructed and arranged to operatively connect with any number of vehicle components including, but not limited to, a fresh air line or canister vent solenoid (CVS). The filter body 46 may comprise any number of materials including, but not limited to, one or more polymeric materials.

Referring to FIGS. 1-2 and 9-10, in a number of variations, a filter cap 82 may be placed on top of the filter body 46 to enclose the filter assembly 22. The filter cap 82 may comprise a cap structure 84, a plurality of spiral vanes 100, and an inlet port 104. In a number of variations, the cap structure 84 may comprise a top component 86 and a body component 88. A through-hole 90 may extend through the top component 86 and may be constructed and arranged to allow air into the dump-able filter 20. The body component 88 may include a first end 92 and a second end 94 and may be any number of shapes including, but not limited to, cylindrical. A locking feature 96 may extend radially from the perimeter of a second end 94 of the body component 88. The locking feature 96 may also be constructed and arranged to house an O-ring 98, for example as illustrated in FIG. 9A. The O-ring 98 may help to ensure that the filter cap 82 and filter body 46 are properly sealed together with little to no gaps which may further prevent dust and/or other contaminants from exiting the dump-able filter 20. The O-ring 98 may comprise any number of materials including, but not limited to, an elastomeric material. The locking feature 96 may be any variation of locking features including, but not limited to, a twist lock feature wherein when the filter cap 82 may be placed on top of the filter body 46 and twisted or rotated in a first direction, the filter cap 82 may lock the tabs 60 on the filter body 46 in place which may lock the filter cap 82 and the filter body 46 together. The filter cap 82 and filter body 46 may make a locking or snapping noise which may indicate to an operator that the filter cap 82 is properly locked onto the filter body 46. An operator may also be able to visually see that the filter cap 82 is properly locked onto the filter body 46. The locking feature 96 may also be tactile so that an operator may feel when the filter cap 82 properly locks onto the filter body 46. This may ensure that the dump-able filter 20 is properly locked into place during assembly or during maintenance. The filter cap 82 and filter body 46 may be unlocked by twisting and/or rotating the filter cap 82 in the opposite direction. In another variation, the filter cap 82 and the filter body 46 may be bonded together, for example but not limited to, welding, however, the dust filter 20 may then be a single use filter.

Figure 10:
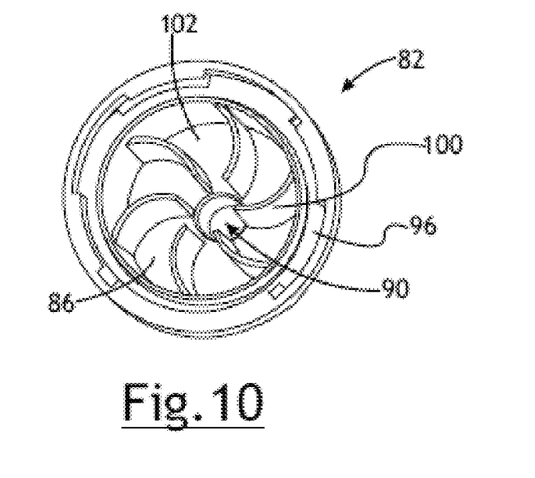
FIG. 10 illustrates a bottom view of a filter cap according to a number of variations.

A plurality of spiral vanes 100 may extend from an inner surface 102 of the top component 86 and may be constructed and arranged to accommodate a first end 28 of the filter carrier 24. The plurality of spiral vanes 100 may be constructed and arranged to increase a surface area of the air flow which may assist in capturing finer dust and/or other contaminants including, but not limited to, mist, as will be discussed below.

Figures 9, 9A, 9B:
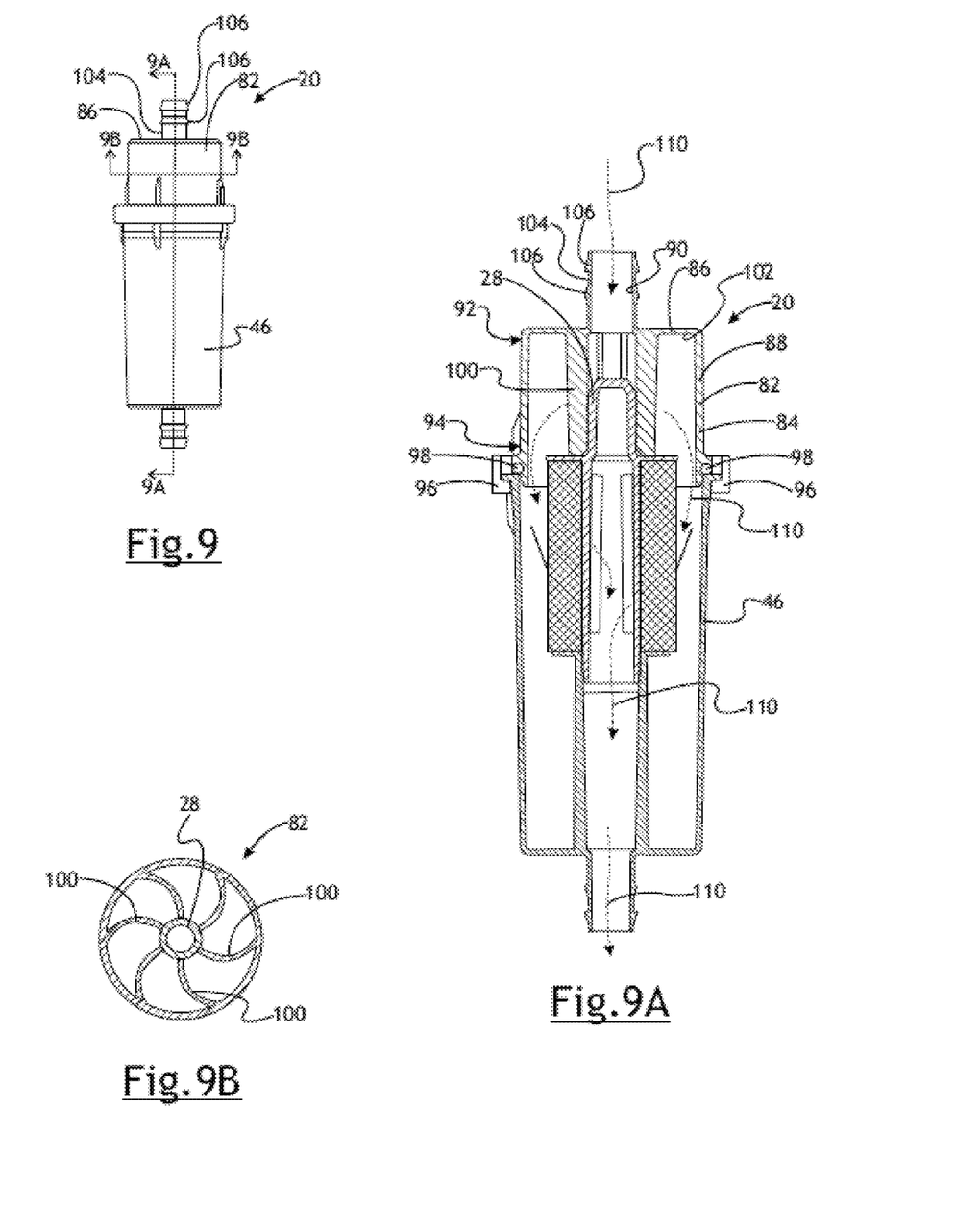
FIG. 9 illustrates a side view of a dump-able dust filter according to a number of variations.
FIG. 9A illustrates a section view of A-A of FIG. 9 according to a number of variations.
FIG. 9B illustrates a section view of B-B of FIG. 9 according to a number of variations.

The inlet port 104 may extend upward from the perimeter of the through-hole 90 extending through the top component 86 of the cap structure 84. The inlet port 104 may include one or more locking features 106 which may include, but are not limited to, one or more locking tabs, for example as illustrated in FIGS. 9 and 9A. The inlet port 104 may be constructed and arranged to operatively connect with any number of vehicle components including, but not limited to, a pre-filter or an outside air source.

Figure 11:
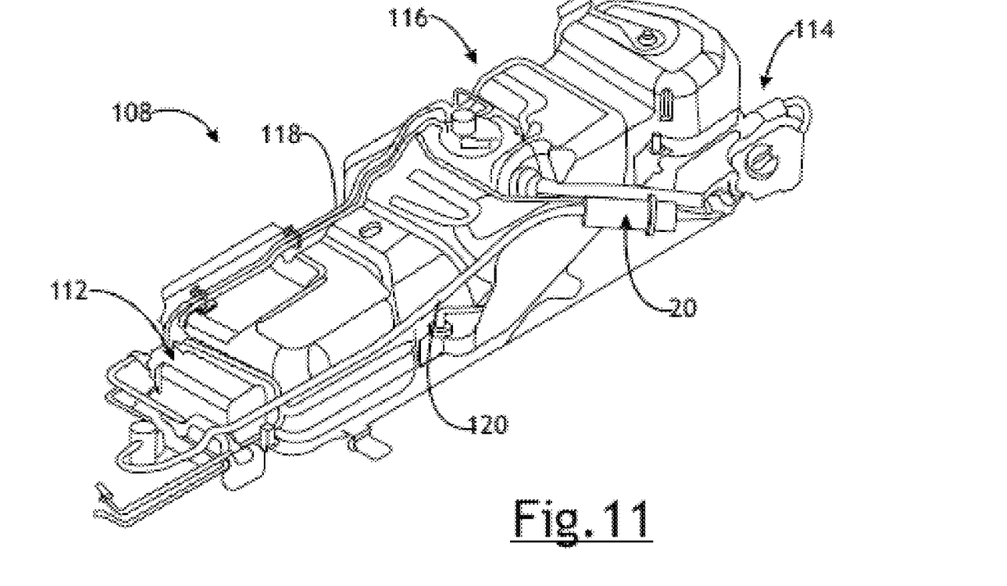
FIG. 11 illustrates a perspective view of a dump-able filter in a fuel system according to a number of variations.

Referring to FIG. 11, in a number of variations, the dump-able filter 20 may be compact and may be attached in various configurations and locations in a vehicle to protect the vehicle's fuel system 108 from dust and/or other contaminants. The dump-able filter 20 may be designed so that it may function in a vertical and/or horizontal position or any position there between. In one variation, the dump-able filter 20 may be attached onto the fresh air line between the CVS and the prefilter 114 or the outside environment. The dump-able filter 20 may be added or removed to an evaporative emission system that may previously exist in a vehicle or may be implemented into a vehicle as the sole dust protection for various systems. Referring to FIG. 9A, in a number of variations, dust and/or other contaminants may enter into the inlet port 104 of the dump-able filter 20. Air, dust, and/or any number of contaminants may then travel through the spiral vanes 100 in the filter cap 82. The spiral vanes 100 may be constructed and arranged to increase the surface area for capturing finer dust and/or other contaminants including, but not limited to, mist. The dump-able filter 20 may be designed so that the dust and/or other contaminants have an increased velocity at the spiral vanes 100 and a decreased velocity as they pass through the filter assembly 22 which may cause the courser dust and/or other contaminant elements to drop out of the flow path 110 and into the dust/contamination collection chambers 76 of the filter body 46, and wherein the finer dust and/or other contaminant elements adhere to the filter assembly 22. Dust/contaminants that accumulate in the dust/contaminant collection chamber 76 and the filter assembly 22 may then be removed during servicing. This may eliminate or reduce the need to replace the entire filter and/or the entire evaporative emission system including the fuel system canister 112 as will be discussed below.

Referring again to FIG. 11, in a number of variations, during refueling of the vehicle, the air flow may be reversed while fuel is entering into the vehicle tank 116. This may cause the fuel vapor in the tank 116 to be displaced by the fuel volume which may cause the fuel vapor to move from the tank 116 through a first tube or pipe 118 to the canister 112, which may comprise any number of materials including, but not limited to, a carbon, and again through a second tube or pipe 120 to the dump-able dust filter 20. The canister 112 may be designed to remove fuel vapor. The reverse flow may dislodge a portion of dust/contaminant from the filter element 38. The dislodged dust/contaminants may then be recaptured by the filter element 38 when the air flow returns to its normal operating state which may occur when the vehicle may be running. The normal operating state may be used to remove any captured fuel vapor which may be in the canister 112 and may meter the vapor into the engine air intake. Therefore, the dump-able dust filter 20 may function as a part of the path for fuel tank air to be released to the atmosphere during refueling.

In a number of variations, various dump-able filters 20 may include different configurations for higher efficiency situations or moderate efficiency situations depending on a customer's vehicle dust/contaminant exposure. Therefore, a customer may easily replace the filter assembly 22 in a vehicle if the customer's dust/contaminant exposure increases or decreases.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a dump-able filter comprising: a filter body; a filter assembly, wherein the filter assembly is seated in the filter body; and a filter cap, wherein the filter cap attaches to the filter body and encloses at least a portion of the filter assembly.

Variation 2 may include a product as set forth in Variation 1 further comprising an O-ring which seats between the filter body and the filter cap to seal the dump-able filter assembly when the filter cap and the filter body are attached together.

Variation 3 may include a product as set forth in any of Variations 1-2 wherein the filter cap interlocks with the filter body when the filter cap is rotated in a first direction onto the filter body and wherein the filter cap unlocks with the filter body when the filter cap is rotated in a second direction.

Variation 4 may include a product as set forth in any of Variations 1-3 wherein the filter cap comprises an inlet port which is constructed and arranged to connect to a vehicle component.

Variation 5 may include a product as set forth in any of Variations 1-4 wherein the vehicle component is at least one of a pre-filter or an outside air source.

Variation 6 may include a product as set forth in any of Variations 1-5 wherein the filter body comprises an outlet port which is constructed and arranged to connect to a vehicle component.

Variation 7 may include a product as set forth in any of Variations 1-6 wherein the vehicle component is at least one of a fresh air line or a canister vent solenoid (CVS).

Variation 8 may include a product as set forth in any of Variations 1-7 wherein the filter cap, the filter assembly, and the filter body form an air flow tunnel which directs an air flow through a flow path, wherein fine contaminants in the air flow adhere to the filter assembly and course contaminants drop into at least one contaminant collection chamber in the filter body.

Variation 9 may include a product as set forth in any of Variations 1-8 wherein the air flow enters into the dump-able filter through an inlet port, is directed through a plurality of spiral vanes located in the filter cap, through a filter carrier body in the filter assembly, through a center tunnel in the filter body, and exits through an outlet port on the filter body.

Variation 10 may include a product as set forth in any of Variations 1-9 wherein the filter assembly comprises: a filter carrier comprising a hollow body including at least one slot, a first end constructed and arranged to mate with the filter cap, a second end constructed and arranged to mate with a filter body, and a lip which extends radially from the hollow body adjacent the first end, and a filter element which extends around the hollow body of the filter carrier, and wherein the filter element includes a barrier element which is attached to at least one of a bottom surface or a top surface of the filter carrier.

Variation 11 may include a product as set forth in any of Variations 1-10 wherein the filter cap comprises a cap structure, wherein the cap structure comprises a top component, a body component, and a plurality of spiral vanes which extend downward from the top component, wherein the body component comprises a first end and a second end, wherein the second end comprises a locking feature which extends radially from the perimeter of the second end and is constructed and arranged to lock together with the filter body; and an inlet port which extends upward from the top component.

Variation 12 may include a product as set forth in any of Variations 1-11 wherein the filter cap is constructed and arranged to house an O-ring.

Variation 13 may include a product as set forth in any of Variations 1-12 wherein the filter body comprises a cup component having a first end and a second end, and wherein a lip extends radially from the first end and includes at least one locking feature which is constructed and arranged to lock together with the filter cap; a center tunnel which extends inside the cup component having a first end and a second end, wherein the first end is constructed and arranged to mate with a filter carrier; at least one contamination collection chamber interposed between the cup component and the center tunnel; and an outlet port.

Variation 14 may include a product as set forth in any of Variations 1-13 further comprising a fuel system, and wherein the dump-able filter is operatively connected to the fuel system.

Variation 15 may include a product as set forth in Variation 14 wherein the dump-able filter functions as a part of the path for fuel tank air to be released to the atmosphere during refueling.

Variation 16 may include a product comprising a dump-able dust filter for a fuel system comprising: a filter body; a filter assembly, wherein at least a portion of the filter assembly is interposed inside the filter body; and a filter cap, wherein the filter cap encloses at least a portion of the filter assembly and locks with the filter body.

Variation 17 may include a product as set forth in Variation 16 wherein the dump-able dust filter is constructed and arranged to remove contaminants from an air flow by sending the air flow through an inlet port on the filter cap, through a plurality of spiral vanes in the filter cap, through a filter carrier in the filter assembly, through a center tunnel in the filter body, and out an outlet port on the filter body; and wherein fine contaminants adhere to the filter assembly, and wherein course contaminants drop out of the flow path into at least one contaminant collection chamber in the filter body.

Variation 18 may include a product as set forth in any of Variations 16-17 further comprising an O-ring interposed between the filter cap and the filter body.

Variation 19 may include a method comprising: providing a dump-able dust filter for a fuel system comprising: providing a filter assembly inside of a filter body and a filter cap; rotating the filter cap in a first direction to lock the filter cap onto the filter body; rotating the filter cap in a second direction to unlock the filter cap from the filter body; removing contaminants from the dump-able dust filter; and replacing the filter cap back onto the filter body and rotating the filter cap in a first direction to lock the filter cap onto the filter body.

Variation 20 may include a method comprising: providing a dump-able dust filter for a fuel system comprising: providing a first filter assembly inside of a filter body and a filter cap; rotating the filter cap in a first direction to lock the filter cap onto the filter body; rotating the filter cap in a second direction to unlock the filter cap from the filter body; removing the first filter assembly from the filter body; providing a second filter assembly inside of the filter body; and replacing the filter cap back onto the filter body and rotating the filter cap in the first direction to lock the filter cap onto the filter body.

As discussed above in connection with FIG. 11 in a number of variations during refueling of a vehicle, the air flow within filter assembly 20 may be reversed while fuel is entering into the vehicle tank 116. As filter element 38 becomes soiled with contaminants, pressure may build within the hollow portions of filter carrier 24. Left unchecked, this pressure may build up and may cause a pressure sensor integrated into fuel filling equipment to prematurely cut off the flow of fuel into the vehicle. The premature shutoff of fuel may present an annoying user experience, particularly if it occurs early in a fuel filling cycle.

With the foregoing in mind in additional variations filter assembly 20 or, more particularly, filter carrier 24 may include a pressure relief valve. Such valve may regulate the pressure within the hollow portion(s) of filter carrier 24 may act as a flow passage for air, e.g., in an air backflow condition that may occur during refueling of a vehicle. As will be appreciated use of such a pressure relief valve may limit or prevent premature shut off of fuel flow, e.g., by extending the amount of time required for sufficient pressure to build in the hollow portions of filter carrier 24 before an overpressure condition is detected by a pressure sensor in fuel filling equipment. This may limit and potentially prevent fuel filling equipment from triggering a premature shutoff in fuel flow, even when filter element 24 is soiled. In this regard reference is made to FIGS. 12 and 13, which depict perspective and cross sectional views of an alternative filter carrier consistent with the present disclosure. As shown filter carrier 24' includes many of the same elements as filter carrier 24. Such The nature and function of such common elements is the same as those previously described in connection with FIGS. 1-11, and therefore a description of such elements is not reiterated here for the sake of brevity. As further shown in FIGS. 12 and 13 however, filter carrier 24' further includes a pressure relief valve (not separately labeled) that includes valve body 201, valve seat 210, biasing member 220, and vent(s) 240. Filter carrier 24' also defines an air passage comprising an opening (e.g., inlet) 230 and one or more outlets e.g., one or more first outlets (e.g. slots 32) to be fluidly coupled to a filter, and one or more second outlets (e.g., an opening defined by or proximate to valve seat 210) in fluid communication with the pressure relief valve.

Figure 13:
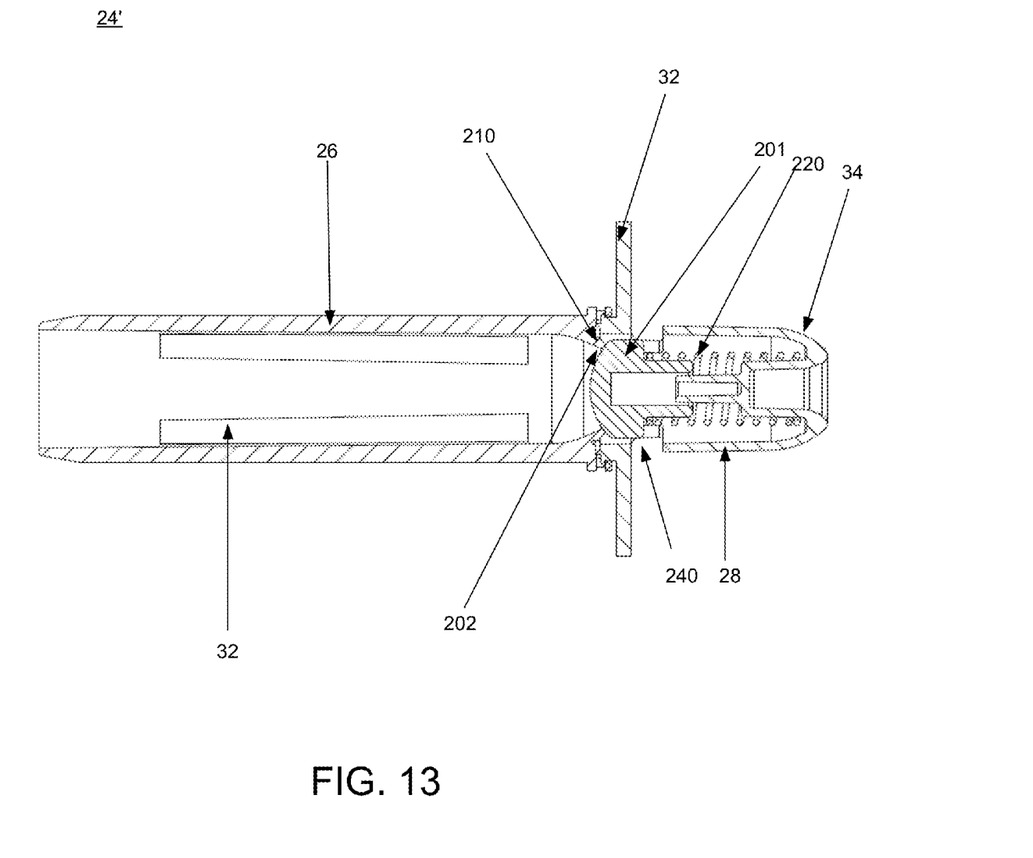
FIG. 13 illustrates a cross sectional view of an example filter carrier including a pressure relief valve consistent with the present disclosure.

Valve body 201 includes a sealing surface 202, as best shown in FIG. 13. When the pressure relief valve is in a closed condition, biasing member may apply a biasing force to valve 201 which may urge at least a portion of sealing surface 201 against valve seat 210. In this condition valve seat 210 and sealing surface 202 may sealingly engage so as to prevent or substantially prevent the passage of air, dust and/or debris. The biasing force may also urge at least a portion of valve 201 past vents 240, such that the seal between sealing surface 201 and valve seat 210 is upstream of vents 240. In this condition valve body may fully or partially block the flow of air dust and/or debris through vents 240. As will be further described later, when pressure within the hollow region of filter carrier 24. It may also be appreciated that in the illustrated embodiment, valve 201 is in the form of a poppet or poppet valve, though of course any suitable valve configuration may be used in the context of the present disclosure.

In various FIGS. sealing surface 202 is illustrated as having a generally convex geometry that may engage and seal with one or more portions of valve seat 210, which may be understood to extend around an inner circumference of a hollow region of body 24 of filter carrier 24'. It should be understood that the illustrated geometry and configuration of sealing surface 210 and valve seat 210 are for the sake of example only, and that such components may have any suitable geometry so long as they may be reversibly engaged to seal and unseal consistent with the present disclosure.

By way of example, valve 201 may be configured with a sealing surface 202 having a generally cylindrical or ellipsoidal profile that may sealingly engage with at least a portion of valve seat 210, which may have a corresponding generally cylindrical or ellipsoidal profile. Sealing of sealing surface 202 and valve seat 210 may also be facilitated by one or more sealing members, such as a sealing ring (O-ring— not separately illustrated) which may be disposed on or about valve seat 210 and/or a sealing surface 202. In such instances valve seat 210 may be in the form of one of more circumferentially extending projections that extend from an inner surface of a hollow portion of filter carrier 24'.

Although portions of valve seat 210 may project at an acute angle inwards towards valve body 201 as shown in FIG. 13, such configuration is not required. For example, valve seat 210 may include projections that extend substantially perpendicular to an inner wall of a hollow region of filter carrier 24'. In such configuration the projections of valve seat 210 may include at least one wall extending substantially perpendicular to an inner wall of filter carrier 24'. Such wall may be configured to sealingly engage a corresponding portion of valve body 201. By way of example at least the periphery of valve body 201 may include a region extending substantially perpendicular to an inner wall of filter carrier 24', e.g., at an angle that matches or is complementary to that of the projections of valve seat 210. In some embodiments, the projections of valve seat 210 and the region of valve body 201 may each extend substantially perpendicular to an inner wall of a hollow region of filter carrier 24'.

As noted previously biasing member 220 is generally configured to apply a biasing force to valve body 201. In general the biasing force may be set or otherwise configured to urge valve body 201 against valve seat 210 to form a seal, thereby preventing or substantially preventing the flow of air, dust and debris through the pressure relief valve. As may be appreciated such seal may be maintained so long as the pressure (backpressure) on the opposite side of valve body 201 (e.g., within a hollow region of filter carrier 24') does not exceed the biasing force applied by biasing member 220. When the backpressure exceeds the biasing force applied by biasing member 220, valve body 201 may be urged by the backpressure laterally within the first end 28 of filter carrier 24', away from valve seat 210 and towards biasing member 220. With sufficient backpressure, valve body 240 may be forced past vents 240, as best shown in FIG. 14F. In this condition, air, dust and debris may pass through vents 240, thereby relieving pressure within the hollow regions of filter carrier 24'.

As noted above one purpose of the pressure relief valves described herein is to extend the amount of time before an overpressure condition is sensed by fuel filling equipment and thus limit or prevent the occurrence of premature fuel shutoffs. In this regard it may be understood that fuel filling equipment may be configured with a pressure sensor that may monitor the pressure within the fuel system of a vehicle during refueling and trigger a fuel shutoff when the monitored pressure exceeds a pressure threshold.

With this in mind in some embodiments the biasing force applied by biasing member 220 to valve body 201 may be configured such that it is less than the pressure threshold that will cause fuel filling equipment to trigger a shutoff of the flow of fuel. In such instances the pressure within filter carrier 24' needed to open the pressure relief valve (i.e., by forcing the movement of valve body 201 against biasing member 220) will be less than the threshold pressure that will trigger a fuel shutoff by fuel filling equipment. Opening of the pressure relief valve may lower the pressure within filter carrier 24' even further below the pressure threshold. In instances where opening of pressure relief valve 24' prevents the further buildup of pressure within filter carrier 24', the pressure relief valve may prevent the occurrence of premature fuel shutoffs attributable to the use of filter element 38 and/or filter carrier 24'. In instances where pressure may continue to build despite opening of pressure the relief valve the time required for pressure within filter carrier 24' to exceed the threshold pressure may be extended, thus extending the amount of time before fuel filling equipment will trigger a shutoff of the flow of fuel.

For the sake of illustration biasing member 220 is illustrated in various of the FIGs in the form of a spring that may be sized to fit within the first end 28 of filter carrier 24'. Although a spring may be preferably used as biasing member 220 the use of a spring is not required. Indeed biasing member 220 may have any form that is suitable to enable the reversible sealing and unsealing of valve body 201 and valve seat 210 as generally described above. For example in some embodiment biasing member 220 may be in the form of a crimped wire (e.g., of shape memory alloy, metal, polymer or the like), Alternatively biasing member may be in the form of a hydraulic or pneumatic piston, i.e., which may apply a biasing force to valve body 201 corresponding to a pressure applied by a hydraulic fluid or gas.

Figure 12:
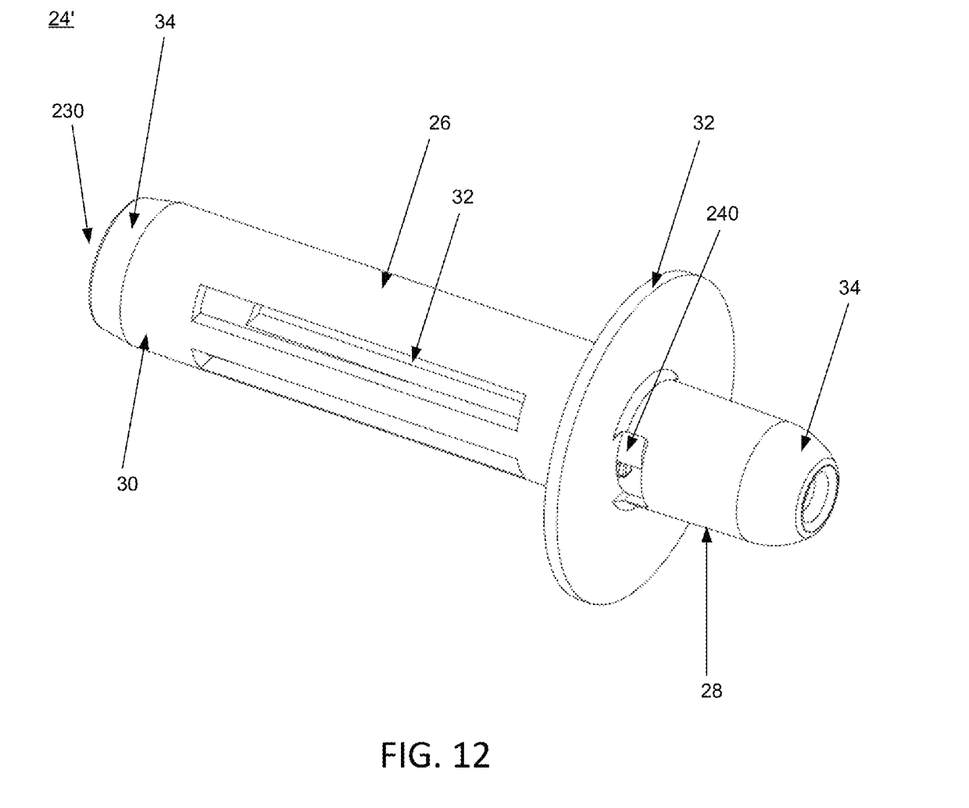
FIG. 12 illustrates a perspective view of an example filter carrier including a pressure relief valve consistent with the present disclosure.

As best shown in FIG. 12, vents 240 may be in the form of one or more openings within the first end 28 of filter carrier 24'. For the sake of illustration vents 240 are illustrated as generally rectangular openings that are formed at the junction of lip 36 and first end 28 of filter carrier 24'. It should be understood that the number, placement and configuration of vents 240 is for the sake of example only, that any number of vents 240 may be used, and that vents 240 may be placed in any suitable fashion and have any suitable profile. In some embodiments vents 240 are sufficiently large to prevent or substantially prevent the buildup of pressure within a hollow region of filter carrier 24' when the pressure relief valve is in a partially or fully open condition. In other embodiments vents 240 are sized so as to relieve pressure within the hollow region of filter carrier 240 but not so large as to prevent the buildup of pressure. In such instances vents 240 may be understood to be configured to extend the amount of time before the pressure within the hollow region of filter carrier 240 exceeds a pressure threshold that will trigger a fuel shutoff by fuel filling equipment, as discussed above.

For the sake of illustration the present disclosure will now proceed to describe the operation of pressure relief valves consistent with some embodiments of the present disclosure, aided by the illustrations shown in FIGS. 14A-14F. Each of FIGS. 14A-14F is a cross-sectional diagram of a filter 20' configured with a filter carrier 24' that includes a pressure relief valve consistent with the present disclosure.

Figure 14A:
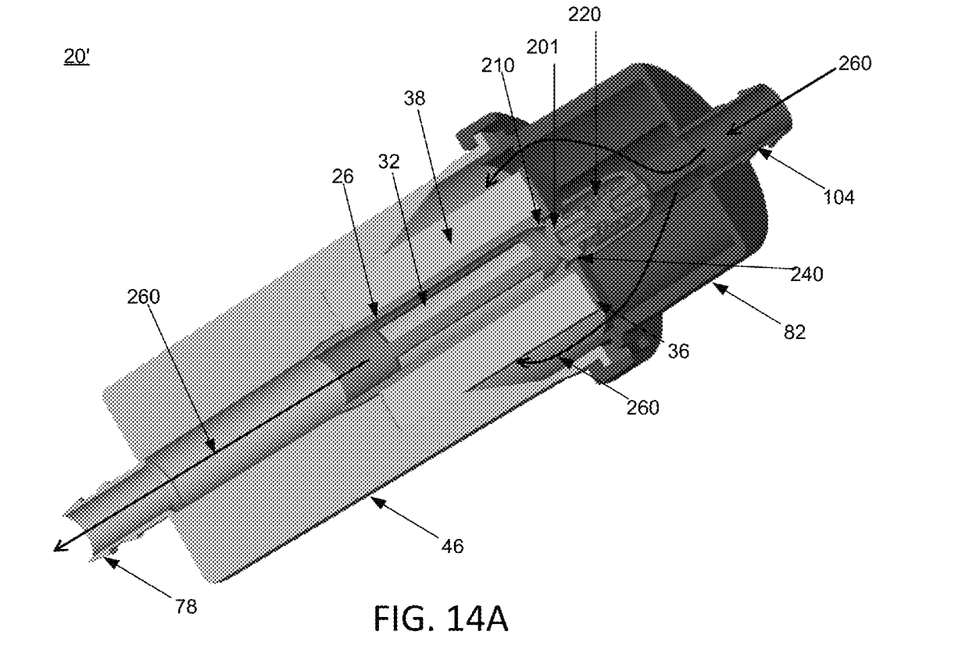
FIGS. 14A and 14B illustrate cross sectional views of an example filter assembly and an example filter carrier including a pressure relief valve under a purge air flow condition consistent with the present disclosure.
Figure 14B:
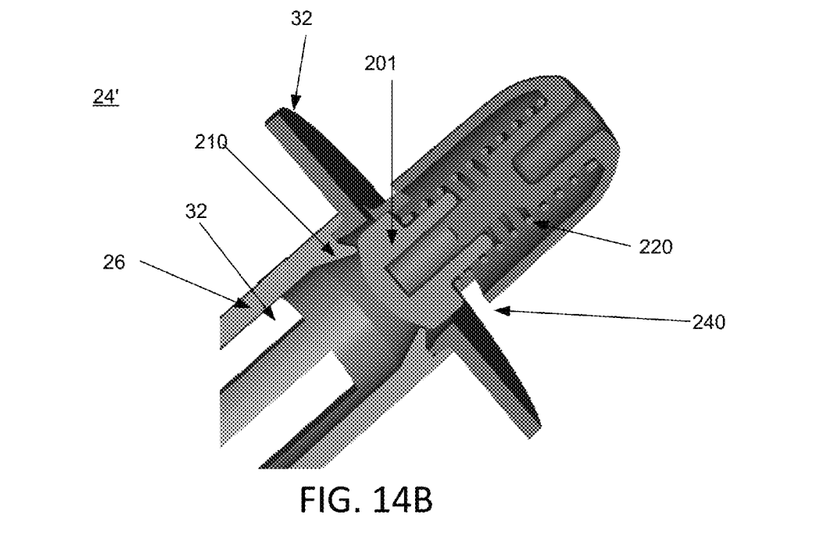
Figure 14C:
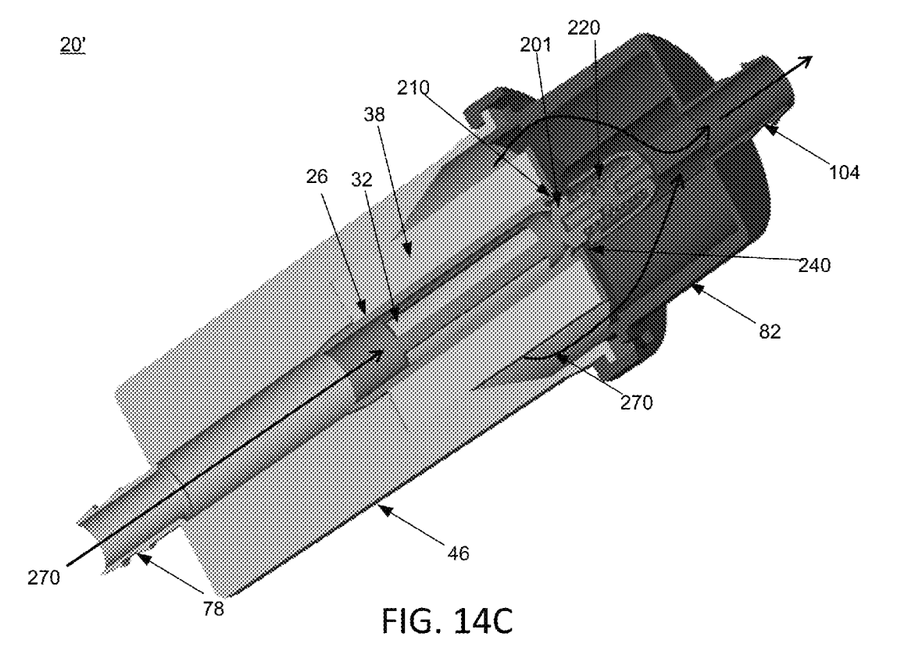
FIGS. 14C and 14D illustrate cross sectional views of an example filter assembly and an example filter carrier including a pressure relief valve under first air back flow condition consistent with the present disclosure.
Figure 14D:
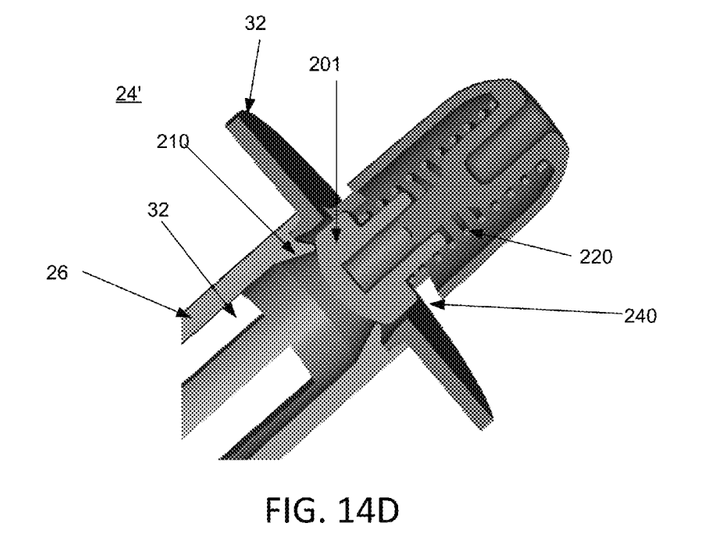

FIGS. 14A and B depict a filter 20' as it is used in a purge air flow condition. In such condition fresh air may enter filter 20' through inlet port 104. The resulting air flow 260 may flow within filter cap 82 and around lip 36. Air flow 260 may then pass through filter element 38, at which time dust and other debris may be trapped within filter element 38. Airflow 260 may then pass into a hollow region of filter carrier 24', e.g., via slots 32. Air flow 260 may then flow within the hollow region to outlet port 78 of filter 20', as illustrated in FIG. 14A. In this condition, biasing member 220 may apply biasing force to urge valve body 201 against valve seat 210, so as to form a seal. As the backpressure within the hollow region of filter carrier 24' is less than the biasing force applied by biasing member 220 the seal between valve body 201 and valve seat 210 may be maintained in this condition, thus preventing air flow 260 from passing through vents 240.

As noted above during refuel of a vehicle the air flow within filter 20' may be reversed. This concept is illustrated in FIGS. 14C-14F. As shown in such FIGS., during reflow an air flow 270 may enter into outlet port 78 of filter 20' and enter into a hollow region of filter carrier 24'. As a result of this air flow, back pressure may build within the hollow region of filter carrier 24'. When filter element 38 is relatively clean, the backpressure may force air flow 270 through filter element 38 without forcing the pressure relief valve open. That is when filter element 38 is relatively clean air flow 270 may pass through filter element 38 when the backpressure within the hollow region of carrier 24' does not exceed the biasing force applied by biasing member 220 against valve seat 201, as best shown in FIGS. 14 C and D.

Figure 14E:
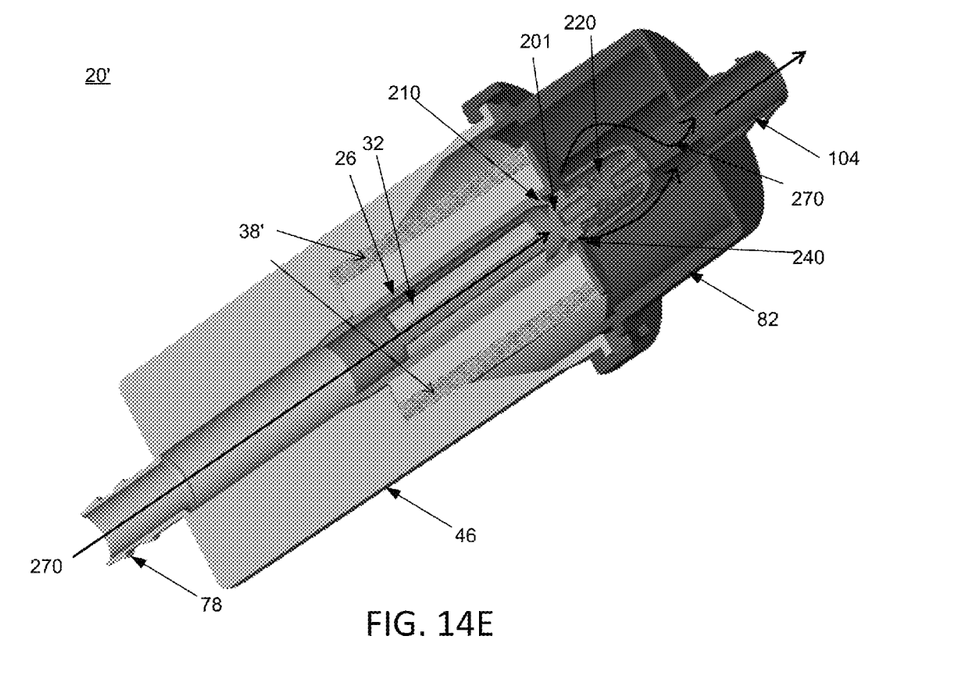
FIGS. 14E and 14F illustrate cross sectional views of an example filter assembly and an example filter carrier including a pressure relief valve under a second purge air flow condition consistent with the present disclosure.
Figure 14F:
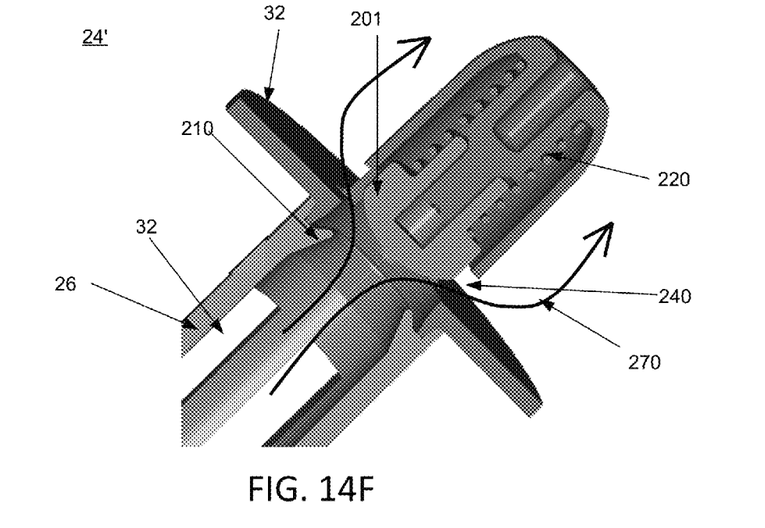

Turning now to FIGS. 14E and F, over time filter element 38 may become soiled with particulates and other contaminants. This concept is shown in FIGS. 14E and 14F, which depict the use of soiled filter element 38'. As will be appreciated, soiled filter element 38' may present greater resistance to air flow 270 than filter element 38. Due to this increased resistance, backpressure within the hollow region of filter carrier 24' may build to the point that it exceeds the biasing force applied by biasing member 220 against valve body 201.

As noted above unless the backpressure in the hollow region of filter carrier 24 in this condition is relieved, it may continue to build until it exceeds a threshold pressure that will cause fuel filling equipment to shut off the flow of fuel. With this in mind when the backpressure exceeds the biasing force applied by biasing member 220, the backpressure may force valve body 201 to move laterally towards biasing member 220 and expose vents 240. At least a portion of air flow 270 may then pass through vents 240 and out inlet port 104, as illustrated in FIGS. 14E and F. The passage of air flow 270 through vents 240 may relieve and/or prevent further buildup of the backpressure in the hollow region of filter carrier 24'. Once the backpressure drops below the biasing force applied by biasing member 220, valve body 201 may again be urged against and seal with valve seal 201.

The following description of additional variants is only illustrative of components, elements, acts, products, and methods considered to be within the scope of the invention and are not in any way intended to limit such scope by what is specifically disclosed or not expressly set forth. The components of the additional variation set forth below may be combined and rearranged other than as expressly described herein, in which case the combination of such components is still within the scope of the present disclosure.

Variation 1'—This variation may include a filter comprising: a filter body; a filter assembly seated in the filter body; and a filter cap attached to the filter body and enclosing at least a portion of the filter assembly wherein the filter assembly comprises a filter carrier, the filter carrier comprising:

a hollow body; a first end constructed and arranged to mate with the filter cap;

a second end constructed and arranged to mate with a filter body;

a filter element which extends around the hollow body of the filter carrier; and a pressure relief valve formed at least in part in the first end, the pressure relief valve configured to relieve pressure in a hollow region of said filter carrier when a threshold pressure is exceeded.

Variation 2'—This variation includes any or all of the elements of variation 1', wherein said filter element comprises a valve seat, a valve body, a biasing member and a vent, the biasing member configured to apply a biasing force to urge said valve body against said valve seat and to block a flow of air through said vent when said backpressure in said hollow region of said filter carrier is less than said biasing force.

Variation 3'—This variation includes any or all of the elements of variation 1', wherein said filter element comprises a valve seat, a valve body, a biasing member and a vent, the biasing member configured to apply a biasing force to urge said valve body against said valve seat and to block a flow of air through said vent when said backpressure in said hollow region of said filter carrier is less than said biasing force.

Variation 4'—This variation includes any or all of the elements of variation 2', wherein said biasing force is less than said threshold pressure.

Variation 5'—This variation includes any or all of the elements of variation 2', wherein said vent is configured to maintain the backpressure below said threshold pressure.

Variation 6'—This variation includes any or all of the elements of variation 2', wherein said vent is configured to slow a buildup of said backpressure and extend a period of time for said backpressure to exceed said threshold pressure.

Variation 1"—According to this variation there is provided a filter carrier comprising a filter carrier body and a pressure relief valve, wherein: the filter carrier body is configured to couple with a filter, the filter carrier body defining an air passage comprising an inlet, a first outlet to be fluidly coupled with said filter, and a second outlet in fluid communication with said pressure relief valve; said pressure relief valve is configured to remain closed when a pressure within said air passage is less than or equal to a first threshold pressure, thereby substantially obstructing said second outlet; and said pressure relief value is configured to open when the pressure within said air passage exceeds said first threshold pressure, thereby opening said second outlet.

Variation 2" This variation includes any or all of the elements of variation 1", wherein said first threshold pressure is less than a second threshold pressure, the second threshold pressure being a pressure that will trigger an automatic shut-off of fuel filling equipment.

Variation 3"—This variation includes any or all of the elements of variation 1", wherein said first outlet comprises one or more slots in said filter carrier body.

Variation 4"—This variation includes any or all of the elements of variation 1", said second outlet comprises a valve seat; said pressure relief valve comprises a valve body and a biasing member; said biasing member is configured to apply a biasing force to said valve body so as to bias the valve body in a direction of said valve seat; when the pressure in said air passage is less than or equal to said first threshold pressure, said biasing force urges a sealing surface of said valve body against said valve seat, such that said pressure relief valve is in a closed condition; and when the pressure in said air passage is greater than said first threshold pressure, said sealing surface is displaced away from said valve seat, such that said pressure relief valve is in an open position.

Variation 5"—This variation includes any or all of the elements of variation 1", and further comprises further comprising a vent downstream of said valve body, wherein: in said closed position, said vent is obstructed by at least a portion of said valve body; in said open position, at least a portion of said vent is exposed such that said vent is in fluid communication with said second outlet.

Variation 6"—This variation includes any or all of the elements of variation 4", wherein said sealing surface has a geometry selected from the group consisting of a generally convex geometry, a cylindrical geometry, and an ellipsoidal geometry.

Variation 7"—This variation includes any or all of the elements of variation 4", wherein said valve seat comprises one or more projections that project towards said valve body to sealingly engage with said sealing surface in said closed position.

Variation 8"—This variation includes any or all of the elements of variation 4", wherein in said open position, said pressure relief valve substantially prevents further buildup of pressure within said air passage.

Variation 9"—This variation includes any or all of the elements of variation 4", wherein: said first threshold pressure is less than a second threshold pressure, the second threshold pressure being a pressure that will trigger an automatic shut-off of fuel filling equipment; and in said open position, said pressure relief valve provides a time interval during which the pressure in said air passage exceeds said first threshold pressure but is less than said second threshold pressure.

Variation 10"—This variation includes any or all of the elements of variation 4", wherein said biasing member is selected from the group consisting of a spring, a crimped wire, a hydraulic piston, and a pneumatic piston.

Variation 11"—This variation includes any or all of the elements of variation 10", wherein said biasing member is a spring.

Variation 12"—This variation includes any or all of the elements of variation 1", wherein said first outlet comprises at least one slot formed in a wall of said filter carrier body.

Variation 13"—This variation includes any or all of the elements of variation 12", wherein: said filter carrier body comprises a outer surface; and said outer surface is configured to releasably engage with said filter.

Variation 14"—This variation includes any or all of the features of variation 1", wherein the filter carrier further comprises a first end and a second end, wherein the pressure relief vale is disposed within said first end.

Variation 15"—This variation includes any or all of the features of variation 14", wherein the first end of the filter carrier is configured to engage a filter cap.

Variation 16"—This variation includes any or all of the elements of variation 5", wherein the filter carrier further comprises a first end and a second end, and wherein: said pressure relief valve is disposed within said first end such that at least a portion of the first end surrounds at least a portion of said valve body; and said first end comprises said vent.

Variation 17"—This variation includes any or all of the elements of variation 16", wherein said first end comprises a tapered section.

Variation 18"—This variation includes any or all of the elements of variation 16", and further comprises a lip extending radially from the filter carrier body.

Variation 19"—This variation includes any or all of the elements of variation 18", wherein said vent is formed proximate a junction between said lip and said filter carrier body.

Variation 20"—This variation includes any or all of the elements of variation 16", wherein said vent extends at least partially about a circumference of an outer surface of said first end.

The above description of select variations within the scope of the invention is merely illustrative in nature and, thus, variations or variants thereof are not to be regarded as a departure from the spirit and scope of the invention.

What is claimed is:

1. A filter apparatus comprising:
   a filter body comprising an inlet passage;
   a filter cap comprising an outlet passage and configured to be removably coupled to said filter body to define a filter cavity;
   a filter medium;
   a filter carrier configured to be removably disposed within said filter cavity, said filter carrier including an elongated filter carrier body having a first end, a second end, and an intermediate section disposed therebetween configured to be coupled to said filter medium, the filter carrier body defining an air passage comprising:
     an inlet disposed proximate to said first end, said inlet configured to be removably fluidly coupled to said inlet passage by way of a first tapered connection therebetween,
     a first outlet disposed within said intermediate section to be fluidly coupled with said filter, and
     a second outlet disposed proximate to said second end, said second outlet configured to be removably fluidly coupled to said outlet passage by way of a second tapered connection therebetween; and
   a pressure relief value in fluid communication with said second outlet;
   wherein said pressure relief valve is configured to remain closed when a pressure within said air passage is less than or equal to a first threshold pressure, thereby substantially obstructing said second outlet; and
   wherein said pressure relief value is configured to open when the pressure within said air passage exceeds said first threshold pressure, thereby opening said second outlet.

2. The filter carrier of claim 1, wherein said first threshold pressure is less than a second threshold pressure, the second threshold pressure being a pressure that will trigger an automatic shut-off of fuel filling equipment.

3. The filter carrier of claim 1, wherein said first outlet comprises one or more slots in said filter carrier body.

4. The filter carrier of claim 1, wherein:
said second outlet comprises a valve seat;
said pressure relief valve comprises a valve body and a biasing member;
said biasing member is configured to apply a biasing force to said valve body so as to bias the valve body in a direction of said valve seat;
when the pressure in said air passage is less than or equal to said first threshold pressure, said biasing force urges a sealing surface of said valve body against said valve seat, such that said pressure relief valve is in a closed condition; and
when the pressure in said air passage is greater than said first threshold pressure, said sealing surface is displaced away from said valve seat, such that said pressure relief valve is in an open position.

5. The filter carrier of claim 1, further comprising a vent downstream of said pressure relief valve, wherein:
in said closed position, said vent is obstructed by at least a portion of said pressure relief valve;
in said open position, at least a portion of said vent is exposed such that said vent is in fluid communication with said second outlet.

6. The filter carrier of claim 4, wherein said sealing surface has a geometry selected from the group consisting of a generally convex geometry, a cylindrical geometry, and an ellipsoidal geometry.

7. The filter carrier of claim 4, wherein said valve seat comprises one or more projections that project towards said valve body to sealingly engage with said sealing surface in said closed position.

8. The filter carrier of claim 4, wherein in said open position, said pressure relief valve substantially prevents further buildup of pressure within said air passage.

9. The filter carrier of claim 4, wherein:
said first threshold pressure is less than a second threshold pressure, the second threshold pressure being a pressure that will trigger an automatic shut-off of fuel filling equipment; and
in said open position, said pressure relief valve provides a time interval during which the pressure in said air passage exceeds said first threshold pressure but is less than said second threshold pressure.

10. The filter carrier of claim 4, wherein said biasing member is selected from the group consisting of a spring, a crimped wire, a hydraulic piston, and a pneumatic piston.

11. The filter carrier of claim 10, wherein said biasing member is a spring.

12. The filter carrier of claim 1 wherein said first outlet comprises at least one slot formed in a wall of said filter carrier body.

13. The filter carrier of claim 12, wherein:
said filter carrier body comprises a outer surface; and
said outer surface is configured to releasably engage with said filter.

14. The filter carrier of claim 1, further comprising a lip extending radially from the filter carrier body.

15. The filter carrier of claim 14, further comprising a vent downstream of said pressure relief valve, wherein:
in said closed position, said vent is obstructed by at least a portion of said pressure relief valve;
in said open position, at least a portion of said vent is exposed such that said vent is in fluid communication with said second outlet;
wherein said vent is formed proximate a junction between said lip and said filter carrier body.

16. The filter carrier of claim 1, further comprising a vent downstream of said pressure relief valve, wherein:
in said closed position, said vent is obstructed by at least a portion of said pressure relief valve;
in said open position, at least a portion of said vent is exposed such that said vent is in fluid communication with said second outlet;
wherein said vent extends at least partially about a circumference of an outer surface of said first end.

* * * * *